US008264504B2

(12) United States Patent
Naimark (10) Patent No.: US 8,264,504 B2
(45) Date of Patent: *Sep. 11, 2012

(54) SEAMLESSLY OVERLAYING 2D IMAGES IN 3D MODEL

(75) Inventor: Michael Naimark, Long Island City, NY (US)

(73) Assignee: University of Southern California, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/216,984

(22) Filed: Aug. 24, 2011

(65) Prior Publication Data

US 2012/0044247 A1 Feb. 23, 2012

Related U.S. Application Data

(63) Continuation of application No. 11/768,732, filed on Jun. 26, 2007, now Pat. No. 8,026,929.

(60) Provisional application No. 60/816,844, filed on Jun. 26, 2006.

(51) Int. Cl.
*G09G 5/00* (2006.01)

(52) U.S. Cl. ........ 345/629; 345/588; 345/619; 345/630; 345/633; 715/848; 715/850; 701/400

(58) Field of Classification Search .................. 345/419; 715/255, 243, 856; 348/370, 584; 707/5
See application file for complete search history.

(56) References Cited

U.S. PATENT DOCUMENTS

| 5,801,704 A | 9/1998 | Oohara et al. |
| 5,982,378 A | 11/1999 | Kato |
| 6,778,171 B1 | 8/2004 | Kikinis |
| 7,133,054 B2 * | 11/2006 | Aguera y Arcas ............ 345/666 |
| 7,505,079 B2 | 3/2009 | Ariga |

(Continued)

FOREIGN PATENT DOCUMENTS

WO 2009124028 A2 10/2009

OTHER PUBLICATIONS

ArtCom. 1995. Invisible Shape of Things Past. Art+Com, Germany (http://web.archive.org/web/20060531110452/www.artcom.de/index.php?option=com_acprojects&page=6&id=26&Itemid=144&details=0&lang=en) (from Archive.org Jun. 12, 2006).

(Continued)

*Primary Examiner* — Xiao M. Wu
*Assistant Examiner* — Phi Hoang
(74) *Attorney, Agent, or Firm* — McDermott Will & Emery LLP (57) ABSTRACT

The present disclosure provides techniques that can enable a community of users to upload arbitrary images of particular locations and integrate them into a 3D model of that location in such a way that they appear as correctly aligned overlays with the model. Users can estimate rough location, orientation, and field of view, for one or more images and then add metadata such as keyword "tags" including time parameters. From the user estimates, a computer system determines the pose of the image relative to the 3D model and stores the metadata. A display system enables a community of users to freely navigate through the 3D model with visual indicators of all of the posed images, filterable via the metadata. Users also have control over a "snap-to-view" feature as they approach any of the posed images as well as a transparency feature for the degree of visibility of the overlaid image.

17 Claims, 5 Drawing Sheets

U.S. PATENT DOCUMENTS

| | | | |
|---|---|---|---|
| 7,616,217 B2* | 11/2009 | Dayan et al. | 345/619 |
| 8,026,929 B2 | 9/2011 | Naimark | |
| 2001/0056308 A1* | 12/2001 | Petrov et al. | 700/98 |
| 2003/0025694 A1 | 2/2003 | Davis | |
| 2004/0044958 A1 | 3/2004 | Wolf et al. | |
| 2004/0075697 A1* | 4/2004 | Maudlin | 345/848 |
| 2005/0017982 A1* | 1/2005 | Kane, Jr. | 345/582 |
| 2005/0105793 A1 | 5/2005 | Sorek et al. | |
| 2005/0177350 A1* | 8/2005 | Kishikawa | 703/1 |
| 2005/0248683 A1 | 11/2005 | Ariga | |
| 2005/0262437 A1 | 11/2005 | Patterson et al. | |
| 2005/0280661 A1 | 12/2005 | Kobayashi et al. | |
| 2006/0119599 A1* | 6/2006 | Woodbury, Jr. | 345/420 |
| 2006/0158448 A1* | 7/2006 | Shimazu | 345/419 |
| 2006/0233423 A1 | 10/2006 | Najafi et al. | |
| 2006/0241860 A1* | 10/2006 | Kimchi et al. | 701/208 |
| 2007/0039030 A1 | 2/2007 | Romanowich et al. | |
| 2007/0052858 A1 | 3/2007 | Zhou et al. | |
| 2007/0110338 A1 | 5/2007 | Snavely et al. | |
| 2007/0174269 A1 | 7/2007 | Jing et al. | |
| 2007/0239150 A1* | 10/2007 | Zvuloni et al. | 606/21 |
| 2007/0271235 A1 | 11/2007 | Frank et al. | |
| 2008/0028341 A1* | 1/2008 | Szeliski et al. | 715/854 |
| 2008/0069445 A1* | 3/2008 | Weber | 382/181 |
| 2008/0111815 A1 | 5/2008 | Graves et al. | |
| 2009/0245691 A1 | 10/2009 | Naimark et al. | |

OTHER PUBLICATIONS

Chen, S. E. et al. 1993. View Interpolation for Image Synthesis. ACM SIGGRAPH Proceedings, pp. 279-288.

Debevec, P. et al. 1996. Modeling and Rendering Architecture from Photographs: A Hybrid Geometry- and Image-Based Approach. Proceedings of SIGGRAPH 96, Aug. 1996.

Fujihata, Masaki. 2002. Field-Work@Alsace. Japan. (http://web.archive.org/web/20051221192056/www.zkm.de/futurecinema/fujihata_werk_e.html) (from Archive.org Jun. 10, 2006).

Google Earth. 2007. http://web.archive.org/web/20070614215554/http://earth.google.com/index.html (from Archive.org Jun. 14, 2007).

Google. 2007. GoogleSketchUp_23Mar07.pdf (from Archive.org Mar. 23, 2007).

Mappr. 2007. Mappr http://web.archive.org/web/20070715061312/http://stamen.com/projects/mappr (from Archive.org Jun. 14, 2007).

McCurdy, N. et al. 2006. A Robust Abstraction for First-Person Video Streaming: Techniques, Applications, and Experiments. IEEE International Symposium on Multimedia (ISM), Dec. 2006.

Naimark, M. 1996. Field Recording Studies. In Immersed in Technology: Art and Virtual Environments, edited by Mary Anne Moser and Douglas MacLeod, MIT Press, 1996, located at http://www.naimark.net/writing/immersed.html printed on Oct. 1, 2008.

Naimark, M. 1998. Art ("and" or "versus") Technology Some Personal Observations. In Art@Science, C. Sommerer and L. Mignonneau, Editors, Vienna and New York: Springer, 1998, located at http://www.naimark.net/writing/versus.html printed on Oct. 1, 2008.

Naimark, M. 1998. Field Cinematography Techniques for Virtual Reality Applications. In VSMM98 Conference Proceedings, 4th International Conference on Virtual Systems and Multimedia Gifu, Japan located at http://www.naimark.net/writing/gifu.html 1998, printed on Oct. 1, 2008.

Naimark, M. 2006. A Collective World Wide Movie Map. located at http://www.naimark.net/projects/bigprojects/wwmm.html Mar. 27, 2006 printed on Jun. 8, 2007.

Naimark, M. 2006. How to Seamlessly "Flickrize" Google Earth. located at http://interactive.usc.edu/members/naimark/archives/006676.html posted Jul. 11, 2006, printed on Oct. 1, 2008.

Naimark, M. 2007. Field Recording Studies. Located at http://www.naimark.net/projects/field.html, printed on Jun. 8, 2007.

Naimark, M. 2007. Dimensionalization Studies. located at http://www.naimark.net/projects/dim.html, printed on Jun. 8, 2007.

Panoramio. 2007. Panoramio_15Mar07.pdf (from Archive.org Mar. 15, 2007) (Google Earth).

Shahabi, C. et al. 2006. GeoDec: Enabling Geospatial Decision Making. IEEE International Conference on Multimedia & Expo (ICME), Toronto,Canada, Jul. 2006.

Shaw, J. 1995. Place—a user's manual. Germany http://web.archive.org/web/20060615190958/jeffrey-shaw.net/html_main/frameset-explore.php3 (from Archive.org Jun. 15, 2006).

Snavely, N. et al. 2006. Photo Tourism: Exploring photo collections in 3D. ACM SIGGRAPH Proceedings, Aug. 2006.

Non-final Office Action, dated Aug. 21, 2008, for U.S. Appl. No. 11/768,732, entitled "Seamlessly Overlaying 2D Images in 3D Model," filed Jun. 26, 2007 (now U.S. Patent No. 8,026,929 B2, issued Sep. 27, 2011).

Final Office Action, dated Feb. 4, 2009 for U.S. Appl. No. 11/768,732, entitled "Seamlessly Overlaying 2D Images in 3D Model," filed Jun. 26, 2007 (now U.S. Patent No. 8,026,929 B2, issued Sep. 27, 2011).

Non-final Office Action, dated Aug. 19, 2009, for U.S. Appl. No. 11/768,732, entitled "Seamlessly Overlaying 2D Images in 3D Model," filed Jun. 26, 2007 (now U.S. Patent No. 8,026,929 B2, issued Sep. 27, 2011).

Final Office Action, dated Mar. 18, 2010, for U.S. Appl. No. 11/768,732, entitled "Seamlessly Overlaying 2D Images in 3D Model," filed Jun. 26, 2007 (now U.S. Patent No. 8,026,929 B2, issued Sep. 27, 2011).

Non-final Office Action, dated Nov. 29, 2010, for U.S. Appl. No. 11/768,732, entitled "Seamlessly Overlaying 2D Images in 3D Model," filed Jun. 26, 2007 (now U.S. Patent No. 8,026,929 B2, issued Sep. 27, 2011).

Notice of Allowance, dated May 27, 2011, U.S. Appl. No. 11/768,732, entitled "Seamlessly Overlaying 2D Images in 3D Model," filed Jun. 26, 2007 (now U.S. Patent No. 8,026,929 B2, issued Sep. 27, 2011).

International Search Report and Written Opinion, dated May 28, 2009, for PCT Application No. PCT/US09/38922, filed Mar. 31, 2009 (published as WO 2009/124028 A2, Oct. 8, 2009), entitled "Estimating Pose of Photographic Images in 3D Earth Model Using Human Assistance," Naimark, Michael et al., inventors.

* cited by examiner

SEAMLESSLY OVERLAYING 2D IMAGES IN 3D MODEL

CROSS-REFERENCE TO RELATED APPLICATIONS

This application is a continuation application of U.S. application Ser. No. 11/768,732, filed Jun. 26, 2007, entitled "Seamlessly Overlaying 2D Images in 3D Model,", which claims priority to U.S. Provisional Application No. 60/816,844, filed Jun. 26, 2006, entitled "A Method and System for Seamlessly Integrating Arbitrary Images Into Pre-Existing 3D Models." The content of both applications is incorporated herein by reference in its entirety.

BACKGROUND

Not long ago, maps appeared online which allowed users of the Worldwide Web to move back and forth and zoom in and out of practically anywhere on Earth. Corresponding satellite imagery soon followed.

More recently, Google Earth, as made available from Google, Inc., made the leap from 2D to 3D representation enabling users to "fly" (control their position and orientation) in virtual 3D space rather than move over the 2D surface of a map or photograph. Google Earth initially relied on topographic information to create hills, mountains, and valleys in the landscape. Recently, these 3D models added simplified extruded building models with simplified (e.g., blank gray) surfaces.

Current work in government, universities, and corporations include building camera cars to sweep through cities, using aerial camera systems, integrating laser radar ("lidar") data, and developing the necessary computational resources to integrate all the data. Such models have been envisioned as exhibiting "ground truth," that is, they will be verifiably accurate when compared to the physical world.

So far, such 3D models have been created as closed, centralized efforts, but various methods have been developed that allow a community of users to create novel applications "on top of" them. For example, Google has made public their Application Program Interfaces (APIs) for Google Maps and Google Earth, allowing other data to be integrated, or "mashed up," into their 2D map or 3D model. One popular "mash-up" application, Mappr, built on top of Yahoo's Flickr, allows a community of users to place their own photographic images in the location in which they were taken. But to date, such photos have only appeared as hovering "playing cards," rather than seamless and integrated.

One solution in the prior art has been to integrate multiple images into the same model (though time artifacts, another potential problem, may occur if the multiple images are captured at different times). Another solution has been to artificially "fill in" the missing information, either by hand (like touching up a photo with a hole in the middle) or in some automated way. A great deal of research is currently underway seeking these kinds of solutions.

While prior art techniques, as described previously, have been developed, currently no techniques exist for a community of users to place their own images into these emerging rich 3D models in an integrated and seamless way, without any visible artifacts.

SUMMARY

Embodiments of the present disclosure can enable a community of users to upload arbitrary images of particular locations and integrate them into a 3D model of that location in such a way that they appear as perfectly aligned overlays with the model. Such 3D models can be any suitable models having sufficient desired degree of resolution of detail, and may be so-called "ground truth" models. Images used in embodiments of the present disclosure are rectilinear (or aspheric) and have a desired degree of focus and resolution.

Upon entering (e.g., uploading) an image to an embodiment (e.g., a system) according to the present disclosure, users can first determine a rough location, orientation, and field of view of a particular 2D image (e.g., one taken by that user), and enter such information. The users can additional further add metadata such as keyword "tags" including time parameters. From the embodiments of the present disclosure can determine the pose of the image(s); and can further store the metadata associated with the image(s).

Systems according to the present disclosure can include a display (e.g., device or system) that is suitable to enable a community of users to freely navigate through the 3D model including visual indicators of all of the posed images, which can be filterable via the metadata. In exemplary embodiments, the users of the system can also have control over a "snap-to-view" feature as they approach any of the posed images, and can control their degree of transparency with which the posed images are seen with respect to the 3D model. Related methods and software programs/code are also disclosed

BRIEF DESCRIPTION OF THE DRAWINGS

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

While certain embodiments are shown in the drawings, one skilled in the art will appreciate that the embodiments depicted are illustrative and that variations of those shown, as well as other embodiments described herein, may be envisioned and practiced within the scope of the present disclosure.

DETAILED DESCRIPTION

Embodiments of the present disclosure are directed to techniques (e.g., systems and/or methods) that can enable a community of users to upload (e.g., transfer) images of a particular location to be viewed within a 3D model of the same location (and possibly nearby/desired geography). The image (s) can be aligned/orientated within such 3D models; and with no artifacts (other than time, which may be considered as a feature or tag associated with the image). These images can be photographic (including historical), pre-recorded video, live video from webcams, or even potentially hand drawn. Accordingly, the community of users requires no a priori knowledge beyond a general sense of where the image was taken.

It should be noted that embodiments of the present disclosure are based on the pre-existence of sufficiently detailed 3D models of a desired area or location. Images may have been used to make these models, to map on the surface of building geometries, for example, but these images are optimal when they contain no or minimal transient foreground objects (people, cars) and are recorded under known or normalized lighting conditions. Hence they are not necessarily considered as "arbitrary." In exemplary embodiments including a 3D model with sufficiently detailed geometry, these "intentional" images can produce interpolated "in-between" images without artifacts. Lighting conditions can be normalized to facilitate use of such interpolated images and minimize most likely exhibit artifacts. If an image or image set (a) contains no or minimal transient foreground objects (people, cars, etc.) and (b) are recorded under known or normalized lighting conditions, they may be classified as "non-arbitrary" and "intentional" and can therefore be used to build the 3D model.

Such a process can be likened to placing a photograph of an actual scene back in the scene using a see-through optical display on a pedestal, like coin-operated binoculars at tourist sites. The display must be virtually in the exact position as the original camera, pointing in the exact same direction, and with the exact same field of view optics, for the image to perfectly align with the scene. Matching these dimensions can be referred to as "finding the pose" of the image.

Once the pose of an image has been properly determined in a 3D model or in the original location, it will appear perfectly aligned when viewed from its original viewpoint. Problems may appear when the viewpoint is anywhere else: artifacts such as occlusions may be visible, since regions may be revealed which were not captured in the original image. The degree of visibility of artifacts is entirely dependent on the content of the scene, on how many "folds" or "crevices" may exist.

Embodiments and aspects of the present disclosure can incorporate, but are not limited to, one or more of the three following assumptions and corresponding novel elements (in any combination).

First, that finding the pose of an image with respect to a 3D model of the same location can be drastically simplified with a little bit of human help. The pose-finding element of the present disclosure uses means to incorporate rough-tuned human feature matching with fine-tuned automated feature matching to determine the pose of an image. As described previously, the person entering/uploading a picture for display in a 3D model can estimate (e.g., get "in the ball park") certain position parameters, thus constraining the bounds of a problem for a computer to solve. After the initial constraint/ estimation provided by a person, known computer algorithms can find the exact point correspondences (e.g., feature matching) and hence determine the pose of the image.

Second, that metadata such as keyword "tags," derived automatically or entered by a community of users, enable a unique form of filtering while navigating through a 3D model populated with posed images. The filtering element of the present disclosure uses means to filter via metadata such as tags for time (including time of day, season, and historical year) as well as for a lively and unpredictable array of properties as determined by a community of users (e.g., couples, dogs, rain, blossoms, sunsets, funny, etc.).

Third, that the integrity of images created by a community of users is respected and that these images are not to be viewed warped, altered, or amid artifacts. Hence, each image is only viewed from its original pose, a single point in the 3D model space. The navigational element of the present disclosure contains means for visual indication to show where images are posed, allows metadata filters by means to show or not show particular images and their visual indications, incorporates a means to "snap to position" when navigating near specific poses, and allows a means to control the degree of transparency of the posed image over the 3D model.

These assumptions and novel elements can be utilized to produce 3D models of actual locations enhanced by unique views submitted by a community of users, seen unaltered and as perfectly aligned overlays, seamlessly navigable from view to view, and filterable by metadata limited only by the community's imagination, as can be seen in the drawings. Applicant notes with appreciation the preparation of images in the drawings by Applicant's employees, Paul Debevec and Perry Hoberman.

Figure 1:
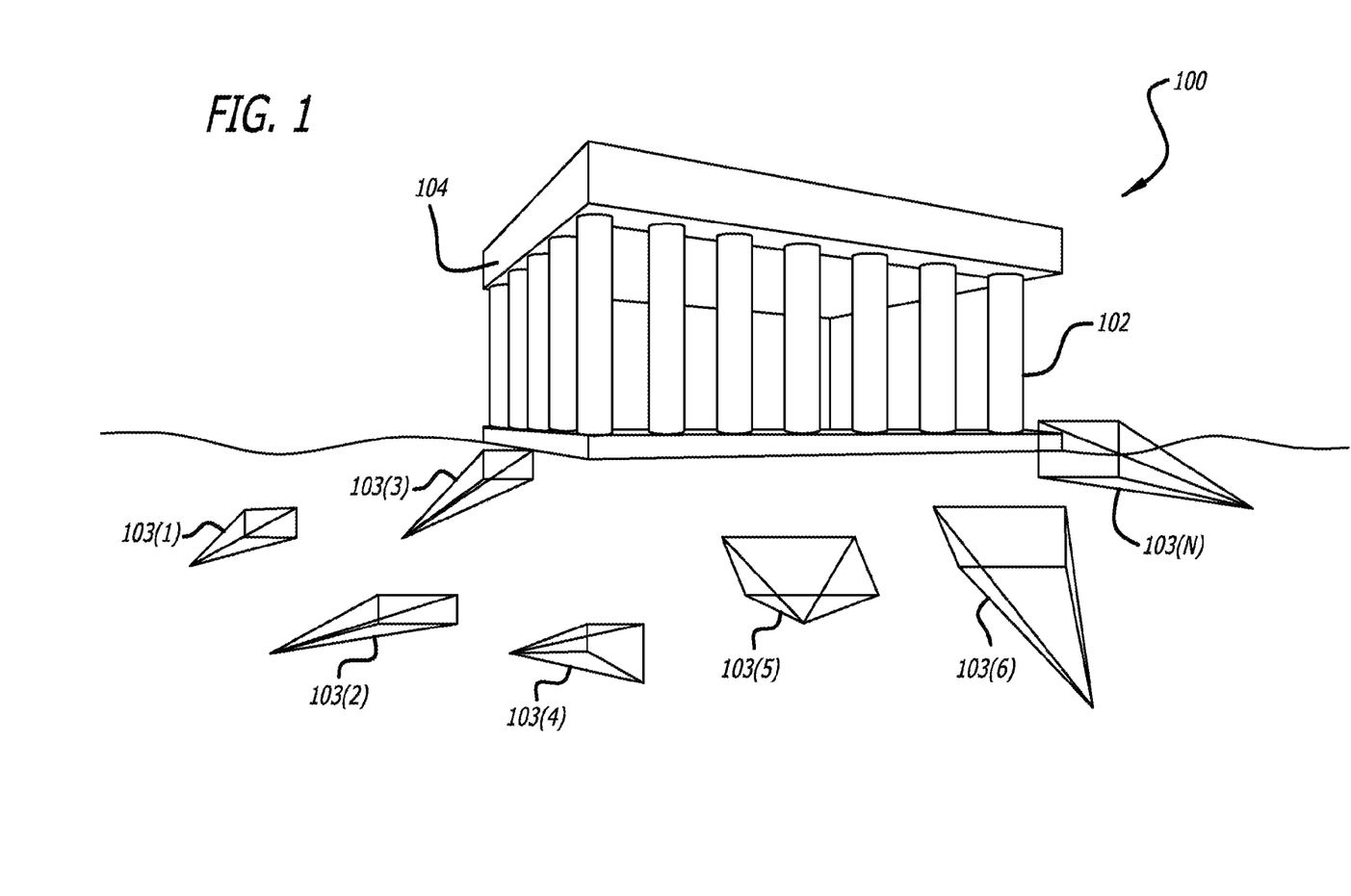
FIG. 1 depicts a view of a 3D model of the Parthenon and surrounding terrain overlaid with multiple position indicators for overlaid 2D pictures, according to an embodiment of the present disclosure.

Turning attention now to the drawings, FIG. 1 depicts a view of a representative 3D model (a computer graphic image) and surrounding terrain overlaid with multiple 2D pictures, according to an prospective embodiment 100 of the present disclosure. Three-dimensional (3D) model 102 can be a computer-readable and electronically storable representation of a desired area of the Earth's (or any) surface with topological relief (e.g., height information). The computer-readable and electronically storable representation is stored on a program storage medium such as a hard disk or CD-ROM. As an example, FIG. 1 depicts a portion 104 of the Parthenon, the most famous surviving building of Ancient Greece and one of the most famous buildings in the world, and surrounding terrain in present day Greece.

As shown in FIG. 1, a number of markers 103(1)-103(N) can be positioned on the 3D model 102 to indicate position of images that have been incorporated into the 3D model by users. In exemplary embodiments, markers 103(1)-103(N) can have a shape (or other discernable feature) that indicates the orientation or pose of the respective image. For example, in FIG. 1, markers 103(1)-103(N) each have a general shape of a square pyramid to allow a user/viewer to see the general pose (e.g., 2D FOV and line of sight) of each image as located/ overlaid on the 3D model.

Exemplary embodiments of the present disclosure provide a "snap-to-image" control feature/functionality. Since the image corresponding to a given marker, e.g., marker 103(1), is viewable only from the pose of the respective image, which can correspond to a single point in the 3D model, a snap-to-view function can be provided to bring a user/viewer to the image as the user/viewer navigates through the 3D model 102. The snap-to-image control changes the amount of "pull" as a user navigates around the 3D model, from "light" (since "none" is not useful) to "heavy." For example, in embodiments including use of a computer mouse, as the user controlled icon gets closer to or within a specified distance of a marker, the cursor can be controlled to move to the marker, and at the same time the corresponding image can be displayed.

Figure 2:
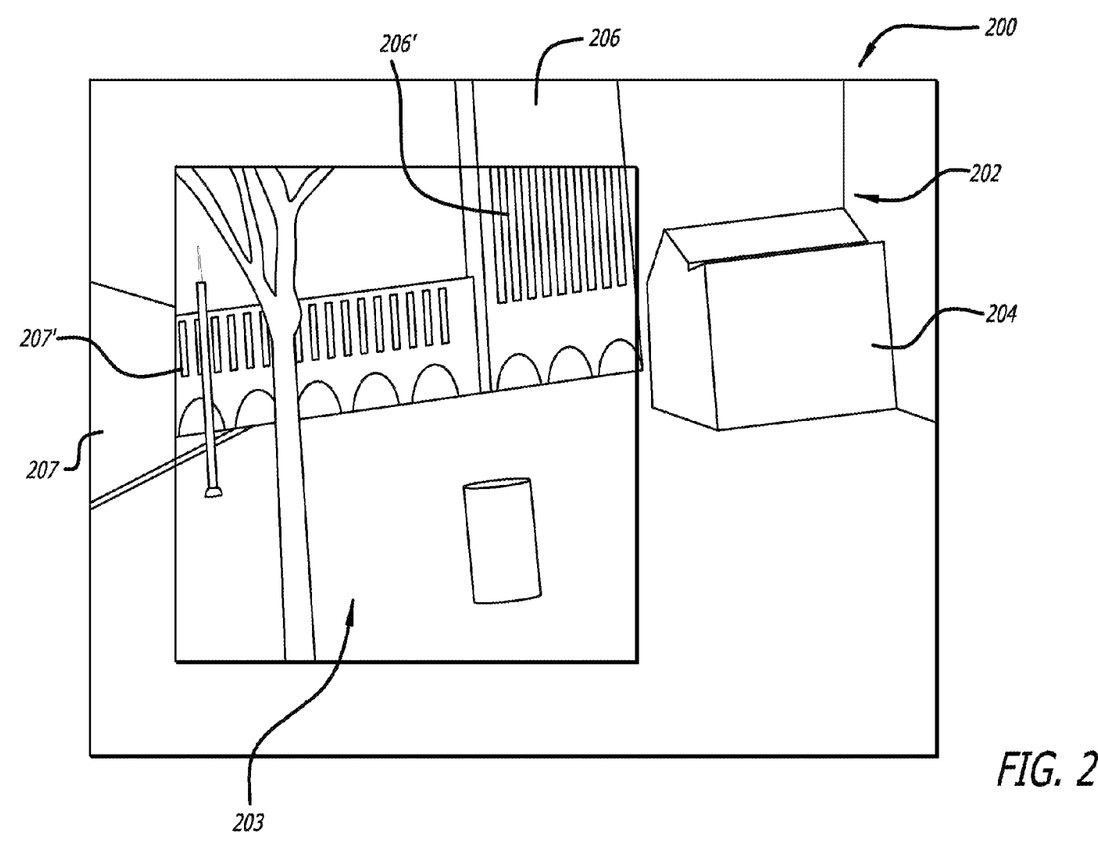
FIG. 2 depicts a view of a 3D model overlaid with a 2D picture, according to an embodiment of the present disclosure.

FIG. 2 depicts a view of a 3D model overlaid with a 2D picture, according to an embodiment 200 of the present disclosure. A representation of a three-dimensional (3D) model 202 of a given geographical location (e.g., a city such as San Francisco) is shown. The 3D model would, in exemplary embodiments, be a very accurate three-dimensional represententation of a given area including accurate topological details/ information, such as height, width, and length, of structures, geological formations, and buildings, e.g., such as 204, 206, and 207 as shown in FIG. 2.

With continued reference to FIG. 2, an image 203 is shown in a view of the 3D model 202 and overlaid on the 3D model 202 at the correct pose as indicated by image 203. As image 203 is overlaid on/in the 3D model at the correct pose, the portions (206', 207') of buildings 206 and 207 shown in image 203 accurately represent the buildings indicated by the model 202.

Figure 3:
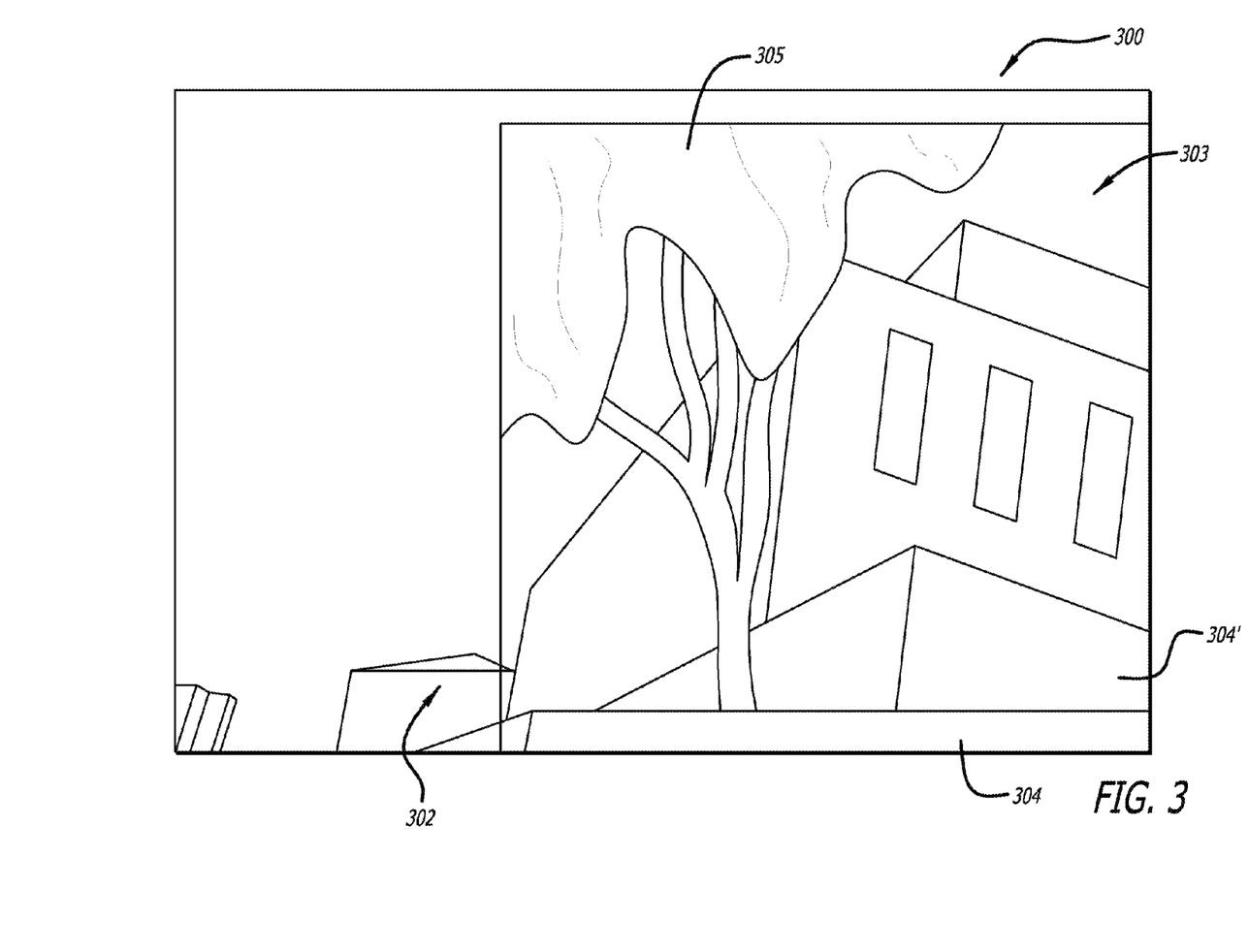
FIG. 3 depicts a view of a 3D model overlaid with a 2D picture, according to another embodiment of the present disclosure.

FIG. 3 depicts a view of a 3D model overlaid with a 2D picture, according to another embodiment 300 of the present disclosure. A representation of a three-dimensional (3D) model 302 includes building 304 of a given geographical location (e.g., a city such as Boston). The 3D model 302 would, in exemplary embodiments, be a very accurate three-dimensional representation of a given area including accurate topological details/information, such as height, width, and length, of structures, geological formations, and building, e.g., such as 304. Image 303 is overlaid on 3D model 302 at the orientation corresponding to the pose of the image 303. At such correct orientation, building 304' of the image 303 lines up or matches with the corresponding building 304 of the 3D model 302. Tree 305 is shown in image 303 and is indicated as being a visual artifact by omission from the 3D model 302.

Figure 4:
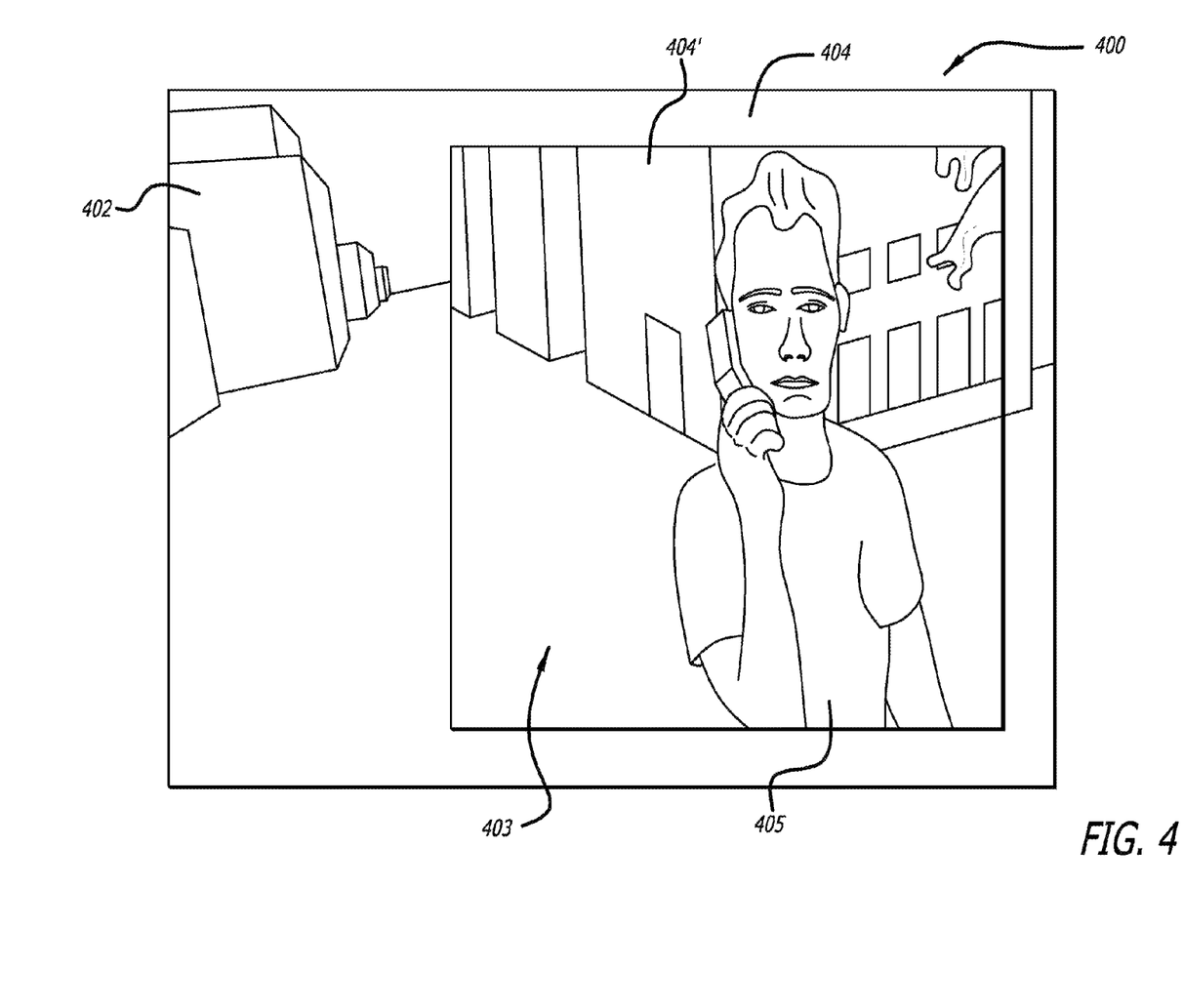
FIG. 4 depicts a view of a 3D model overlaid with a 2D picture, according to another embodiment of the present disclosure.

FIG. 4 depicts another view of a representational 3D model overlaid with a 2D picture, according to another embodiment 400 of the present disclosure. As can be seen, a representation of a three-dimensional (3D) model 402 of a given geographical location (e.g., a city such as New York City) includes various urban features. Image 403 is overlaid on model 402 at an orientation (relative to model 402) that matches the pose of the image 403. Accordingly, building 404' of the image 403 matches up with the corresponding building 404 of model 402. A person 405 is shown, as another example of a visual artifact not present in the 3D model 402.

Figure 5:
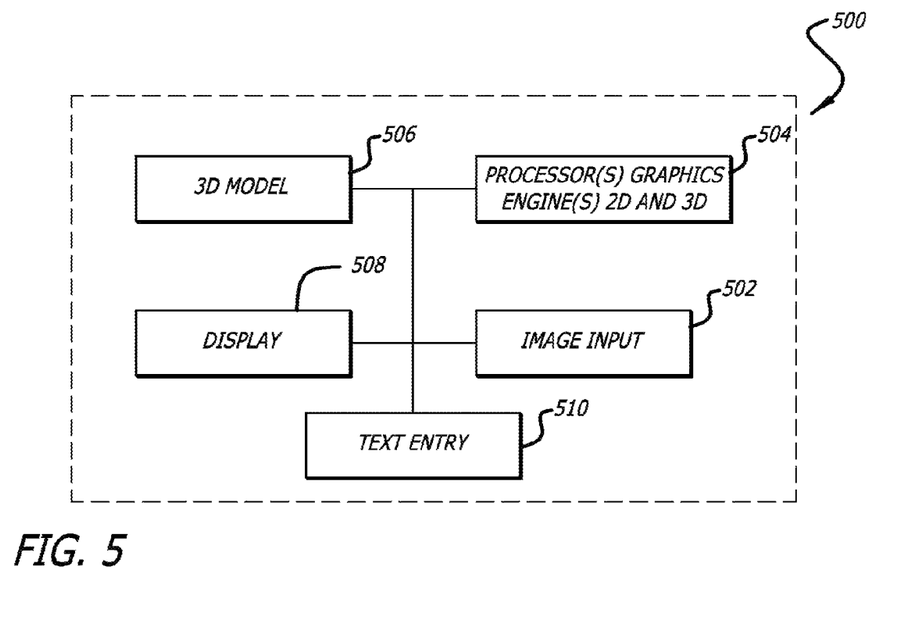
FIG. 5 depicts a diagrammatic representation of a system according to an embodiment of the present disclosure.

FIG. 5 depicts a diagrammatic representation of a system 500 according to an embodiment of the present disclosure. The system 500 can include a common computer (e.g., PC) with: a means to input 502 a captured image from a camera (common with all digital cameras, usually via USB port); suitable 2D graphics capability 504 including user-controlled navigation (pan, tilt, zoom) (like Google or Yahoo Maps, MapQuest); suitable 3D graphics capability 504 including user-controlled navigation (minimum: x, y, z, pan, and tilt like Google Earth, plus possibly rotation for the input); a 3D model 506 (which can be located/manipulated in 504); a user display 508; and, standard text entry and search 510 functionality (like Google or Yahoo search).

The computer is configured and arranged to perform feature matching of the image(s) against the 3D model, based on user estimated positional constraints. Accordingly, the 8-dimensional problem needed to be solved to find the correct pose of an images is performed by the system 500, which process can be facilitated by user-supplied estimates of the position and orientation of the image, which can constrain and simplify the 8-dimensional problem of feature matching to the 3D model.

With continued reference to FIG. 5, it will be appreciated that in exemplary embodiments, everything (i.e., the functional components of system 500), other than inputting images 502, can be embedded in and/or performed through a standard Web browser application with Internet connectivity using a standard server/client configuration.

Figure 6:
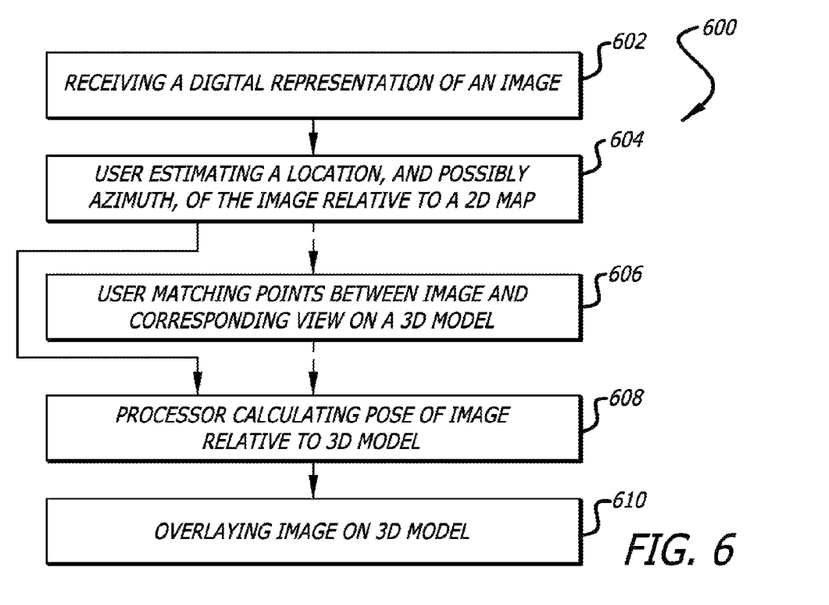
FIG. 6 depicts a method according to an embodiment of the present disclosure.

FIG. 6 depicts a method 600 according to an embodiment of the present disclosure. A digital representation (e.g., JPEG, Bitmap, etc.) of an image can be received (e.g., uploaded by a user), as described at 602. The user can also estimate and indicate the location, and possibly azimuth (or pointing direction), that the image was taken relative to a 2D map of the terrain/locale including the location the image was taken (e.g., a 2D projection of the 3D model), as described at 604. The user can also, optionally, match points between the image and the 3D model, as described at 606.

With continued reference to FIG. 6, processor(s) and/or computer(s) can, with the benefit of the constraints provided by the user estimations (at 604 and 606) calculate the pose of the image, as described at 608, e.g., by feature matching. The image can then be placed or overlaid on the 3D model at the correct position and orientation corresponding to the pose of the image, as described at 610. It will be understood by one skilled in the art that methods according to the present disclosure, e.g., as described for FIG. 6, can be embodied in software programs/code for execution by computer systems.

Regarding the user estimations, the more estimation (rough-tuning of position and orientation) the user does, the more constrained the search space is for the computer to fine-tune a match in the 8-dimensional search space, described previously.

A related feature provided by embodiments of the present disclosure is that entering tags (keywords) associated with one or more images is a uniquely human endeavor in terms of both need and desire, e.g., people will typically desire to enter their own unique and personal tags for their own image(s)— though many of the more prevalent/desired tags may eventually be generated by computer. Because of the feature of the user supplying tags for the image(s), human interaction is implicitly involved to some degree; the additional process of the user estimating position/orientation of the image(s) represents minimal inconvenience to the user. It is anticipated, however, that through built-in instrumentation in cameras like GPS and eventually angular sensing, such user interaction/ estimation may be unnecessary in embodiments of the present disclosure, except for possibly the actual tagging of the image(s).

As an example of the benefit of user position estimation, roughly pointing to the location of the photo on a map greatly constrains 2 of the 8 dimensions from the entire planet to, say, a 100 foot diameter circle. For example, there could be a check box for "did you not shoot this from the ground level?" locking down the 3rd lateral dimension to, e.g., a 10 foot region. This constraining of the problem, in itself, is sufficient for embodiments of the present disclosure, e.g., the computer system of FIG. 5, to do the rest and complete the feature matching between an image and the 3D model.

In embodiments where the input image can be displayed side by side with the 3D model image from roughly the same xyz position, asking the human to match several points that correspond would greatly constrain the search even more. Specifically, the human could pan/tilt the 3D model image to maximize visual overlap, then go about matching points. Even matching a couple will greatly constrain the search space for the computer.

Though there may be a community of people who wish to take "intentional" photos to be interpolated or otherwise "melded" into a larger entity (like the Google SketchUp community), most people are thought to desire to take photos just to take photos to have and to share (Yahoo Flickr). For this latter community, respecting the integrity of the image is important, hence the only way to show it seamlessly integrated into a pre-existing 3D model without any artifacts (other than time of day/lighting) is from its original pose.

Exemplary Embodiment(s)

With continued reference to FIGS. 1-6, exemplary embodiments can include an input mode and a display mode (for example as indicated in FIG. 5):

In exemplary embodiments, an input mode/apparatus can be configured/manifested as a web page that displays an uploaded image, a navigable map that includes the location of the image, a navigable 3D model corresponding to the map, and text entry fields. The user can first be asked to place a point on the map that is the closest guess to the image's location.

Once the location is entered, the corresponding 3D model jumps to the corresponding location and queries the user to match the orientation (pan, tilt, and rotation) and field of view (zoom). The user may then be asked to match points between the image and the model. These may be points of high contrast such as corners of buildings, streets, mountain peaks, etc. They should preferably not be points on anything transient or potentially transient (such as tree branches). The system then determines the optimal pose, roughly based on how rich or sparse the underlying 3D model is. It then displays the pose by overlaying the image onto the 3D model view and asks the user for confirmation.

After confirming the pose of the image, the user can be asked to submit keyword tags. Preferably at the very least the time and date of the image can be entered (the may be automated via in-camera time stamps). Beyond that, tags may be entered entirely on the whim of the community of users.

A display mode/apparatus can be similar to any standard 3D model display in terms of navigational controls but with additional features. Visual indications of the available images can be displayed in a manner minimal but indicative of the location, orientation, and field of view. A simple interface for filtering by time (of day, or season, or historical time) and a simple keyword entry field for filtering by keyword tags, both determine which of the available images to indicate.

As described previously, another feature provided by exemplary embodiments of the present disclosure is a "snap-to-image" control. Since the image, e.g., image 203 in FIG. 2, are viewable only from the pose of the respective image, which corresponds to a single point in the 3D model, without a snap-to-view function, finding such points will be difficult. The snap-to-image control changes the amount of "pull" as one navigates around the model, from "light" (since "none" is not useful) to "heavy."

In further exemplary embodiments, an overlay transparency control may be provided, determining how much the underlying 3D model is seen when an image is viewed, from "no 3D model" (in which case the user would simply move among posed images) to "no uploaded images" (which entirely switches off all posed images). A typically pleasing setting would be 50% transparency, allowing both the 3D model view and the posed image view to be seen equally.

Optional Features

The pose-finding element can utilize human help, though it in exemplary embodiments such can be entirely automated with sufficient computational power. Cameras with GPS can also allow the point-on-the-map step to be automated. Cameras with orientation and zoom sensors could additionally allow the orientation and field-of-view steps to be automated as well. Computer and database programs of sufficient computing power can allow for comparison of uploaded images to every possible view from every possible location, anywhere. For example, related work is underway which will allow pedestrians to take a photo with their camera phone, send it to a central database, and be sent back an indication of where they are.

Currently, warped images such as fisheye images, some tiled panoramas, and some hand-drawn images may need to be made photographically rectilinear for some embodiments. In further embodiments, such images could be "de-warped" automatically to match the 3D model as well.

Uploaded video is also a exemplary option. If the video camera is fixed in all (8) dimensions during recording, then the pose will be constant and the only additional feature required would be visual indicators in the 3D model to distinguish video from still imagery and a means to play and/or browse the material. If the video is from a moving or zooming camera, once the pose of the first frame is determined, the fine-tuning properties of the automated feature-matching algorithm can progressively determine next frames.

Another exemplary option includes enhancing the properties of the visual indicators. Ideally, they would show all 8 parameters of the pose in simple graphic form (z, y, z, pan, tilt, rotation, 2D field of view or "FOV"), which in itself can be cumbersome. They may also show some actual depiction of the image itself, perhaps as a thumbnail image. Or they may include its image projected onto the model (even if visible from the wrong viewpoint), such that its intensity increases as the viewpoint is approached to make the actual viewpoint viewing appear as a smooth transition. The image indicators, may in exemplary embodiments, indicate a perspective change when viewed off axis from the correct pose direction.

Embodiments of the present disclosure, e.g., methods and systems, will behave differently with sparse 3D models and rich 3D models, and with sparsely populated posed images and densely populated posed images. As more and more ground truth 3D models are developed, as it is expected that rich 3D models will exist for everywhere on Earth and that lively communities of users will upload millions and millions of images to them, the scope of the present disclosure is expected to increase.

While certain embodiments have been described herein, it will be understood by one skilled in the art that the methods, systems, and apparatus of the present disclosure may be embodied in other specific forms without departing from the spirit thereof. Accordingly, the embodiments described herein are to be considered in all respects as illustrative of the present disclosure and not restrictive.

What is claimed is:

1. A system for generating pose data for posing a 2D image of a scene aligned within an environment of the scene as depicted by an environment image that is associated with a 3D model, the system comprising a computer processing system configured to:
receive a digital representation of the 2D image;
receive a user's specification of an approximate location of the scene on a two-dimensional geographic map;
obtain an environment image of the environment of the scene that corresponds to the approximate location specified by the user;
cause the 2D image of the scene and the environment image of the scene to both be displayed to the user in a manner that places corresponding features common to both the 2D image and the environment image simultaneously in view of the user and in a manner sufficient to allow the user to match one or more of these corresponding features;
receive alignment information from the user indicative of adjustments to the relative positioning between the displayed 2D image and the displayed environment image that are needed to cause the two images to align; and generate and store the pose data based on the alignment information.

2. The system of claim 1 wherein the computer processing system includes a 3D graphics engine and is configured to obtain the environment image by causing the 3D graphics engine to jump to a rendering of the 3D model at the approximate location specified by the user.

3. A tangible, non-transitory program storage medium, readable by a computer system, embodying a program of instructions executable by the computer system that cause the computer system to generate pose data for posing a 2D image of a scene aligned within an environment of the scene as depicted by an environment image that is associated with a 3D model, the instructions being configured to cause the computer system to:

receive a digital representation of the 2D image;

receive a user's specification of an approximate location of the scene on a two-dimensional geographic map;

obtain an environment image of the environment of the scene that corresponds to the approximate location specified by the user;

cause the 2D image of the scene and the environment image of the scene to both be displayed to the user in a manner that places corresponding features common to both the 2D image and the environment image simultaneously in view of the user and in a manner sufficient to allow the user to match one or more of these corresponding features;

receive alignment information from the user indicative of adjustments to the relative positioning between the displayed 2D image and the displayed environment image that are needed to cause the two images to align; and generate and store the pose data based on the alignment information.

4. The storage medium of claim 3 wherein the obtaining the environment image includes causing a 3D graphics engine to jump to a rendering of the 3D model at the approximate location specified by the user.

5. A system for allowing a user to freely navigate through a 3D model to view 2D images of scenes posed within an environment of the scene as depicted by an environment image that is associated with the 3D model, the system comprising:

a computer storage system configured to contain:
a plurality of 2D images, each of a scene; and
a pre-existing 3D model which includes the environment of each scene and which is not constructed using the 2D images; and a computer system configured to allow a user to:
navigate to different locations throughout the 3D model;
to see a visual indicator of each 2D image within the 3D model at a location within the 3D model that corresponds to the location of the scene depicted by the 2D image;
to take action in connection with each visual indicator; and
in response to the user taking action with respect to each visual indicator, to cause the user to see the 2D image posed as a substantially-aligned overlay within an environment of the scene as depicted by an environment image that is associated with the 3D model in a manner which respects the integrity of the original 2D images by presenting them without alteration.

6. The system of claim 5 wherein the pre-existing 3D model is of an area of the earth.

7. The system of claim 5 wherein the computer system is configured to receive an upload of the 2D images from users.

8. The system of claim 5 wherein the computer system is configured to receive the 2D images from users over a web interface.

9. The system of claim 5 wherein at least one of the 2D images is a historical photograph of the scene.

10. The system of claim 5 wherein at least one of the 2D images is a pre-recorded video of the scene.

11. The system of claim 5 wherein at least one of the 2D images is a live video of the scene.

12. The system of claim 5 wherein at least one of the 2D images is a hand-drawn image of the scene.

13. The system of claim 5 wherein the 2D images are supplied by a community of users and wherein the computer system is configured to allow each user within the community to view each 2D images posed within the environment of the scene as depicted by the environment image that is associated with the 3D model.

14. The system of claim 5 wherein the computer system is configured to receive and store keyword tags from users that are descriptive of the 2D images.

15. The system of claim 5 wherein at least one of the 2D images includes a transient foreground object within the scene.

16. The system of claim 5 wherein at least one of the 2D images contains a transient foreground object that is only temporarily in the image.

17. A tangible, non-transitory program storage medium, readable by a computer system, embodying a program of instructions executable by the computer system that cause the computer system to allow a user to freely navigate through a 3D model to view 2D images of scenes posed within an environment of the scene as depicted by an environment image that is associated with the 3D model, the instructions being configured to cause the computer system to:

store a plurality of 2D images, each of a scene;

store a pre-existing 3D model which includes the environment of each scene and which is not constructed using the 2D images;

allow a user to:
navigate to different locations throughout the 3D model;
to see a visual indicator of each 2D image within the 3D model at a location within the 3D model that corresponds to the location of the scene depicted by the 2D image;
to take action in connection with each visual indicator; and
in response to the user taking action with respect to each visual indicator, to cause the user to see the 2D image posed as a substantially-aligned overlay within an environment of the scene as depicted by an environment image that is associated with the 3D model in a manner which respects the integrity of the original 2D images by presenting them without alteration.

* * * * *